United States Patent
Efendowicz et al.

(10) Patent No.: US 9,313,564 B2
(45) Date of Patent: Apr. 12, 2016

(54) LINE INTERFACE UNIT WITH FEEDBACK CONTROL

(75) Inventors: Avner Efendowicz, Tel-Aviv (IL); Gilad Weiss, Raanana (IL); Nir Tishbi, Kfar Saba (IL)

(73) Assignee: Broadcom Corporation, Irvine, CA (US)

( * ) Notice: Subject to any disclaimer, the term of this patent is extended or adjusted under 35 U.S.C. 154(b) by 104 days.

(21) Appl. No.: 13/450,624

(22) Filed: Apr. 19, 2012

(65) Prior Publication Data

US 2013/0279517 A1 Oct. 24, 2013

(51) Int. Cl.
*H04L 12/66* (2006.01)
*H04Q 11/04* (2006.01)

(52) U.S. Cl.
CPC ... *H04Q 11/0421* (2013.01); *H04Q 2213/1332* (2013.01); *H04Q 2213/13305* (2013.01)

(58) Field of Classification Search
USPC ........ 370/252, 353, 419, 463, 466; 324/750.3
See application file for complete search history.

(56) References Cited

U.S. PATENT DOCUMENTS

| | | | |
|---|---|---|---|
| 4,317,963 A * | 3/1982 | Chea, Jr. | 379/377 |
| 5,013,932 A * | 5/1991 | Smith | 327/100 |
| 6,522,646 B1 * | 2/2003 | Madonna | 370/353 |
| 2007/0036180 A1 * | 2/2007 | Shenoi | 370/516 |
| 2007/0248182 A1 * | 10/2007 | Copetti et al. | 375/289 |
| 2011/0006792 A1 * | 1/2011 | Otsuga et al. | 324/750.3 |

OTHER PUBLICATIONS

International Telecommunication Union; Series G: Transmission Systems and Media, Digital Systems and Networks; *Physical/electrical characteristics of hierarchical digital interfaces*; G.703, Nov. 2001.

* cited by examiner

*Primary Examiner* — Yemane Mesfin
*Assistant Examiner* — Mon Cheri Davenport
(74) *Attorney, Agent, or Firm* — Brinks, Gilson & Lione

(57) ABSTRACT

A Line Interface Unit (LIU) can communicate a number of electromagnetic waveforms consistently fitting into a variety of specific waveform masks, such as masks defined by ITU-T G.703. The LIU includes a transmit part that includes a feedback controller that facilitates the LIU outputting electromagnetic waveforms consistently fitting into the specific waveform masks. The feedback controller can compensate for changes in environmental conditions, such as supply voltage, line profile, line impedance per protocol, doping gradient, and temperature. Also, this feedback controller allows for avoiding constant hardware modifications to the LIU for adjusting to different protocols or masks. It also can enable the LIU to instantiate a great number of times, such as twenty-one times on the same die, where the transmit part performs the feedback controller independently for each instantiation.

21 Claims, 15 Drawing Sheets

| win_sel<1:0> | Minimum Window Width | comp_High='0' | | comp_High='1' | |
|---|---|---|---|---|---|
| | | Output Selection | Steps from Default | Output Selection | Steps from Default |
| 00 | 1 step | 16 (default) | 0 | 17 | +1 |
| 01 | 2 steps | 15 | -1 | 17 | +1 |
| 10 | 3 steps | 15 | -1 | 18 | +2 |
| 11 | 4 steps | 14 | -2 | 18 | +2 |

Figure 11

LINE INTERFACE UNIT WITH FEEDBACK CONTROL

TECHNICAL FIELD

The disclosure relates to line interface units (LIUs). The disclosure also relates to a line interface unit for driving data in different carrier formats.

BACKGROUND

The telecommunications industry is experiencing rapid growth. Telecommunications operators are searching for new solutions to be configured into the communication networks to provide broader bandwidth, better quality and new services. The use of line interface units may be considered a promising technology for different carrier protocols. Typically, these protocols are configured as line interface units in a semiconductor chip, such as a silicon chip. The chips usually function as transceivers to transmit and receive information to and from a telecommunications line, respectively.

BRIEF DESCRIPTION OF THE DRAWINGS

The system may be better understood with reference to the following drawings and description. In the figures, like reference numerals designate corresponding parts throughout the different views.

FIG. 11 is a table summarizing logic for output of an example 5-to-31 decoder associated with the reference voltage generator depicted in FIG. 9.

DETAILED DESCRIPTION

The discussion below provides a line interface unit (LIU) for driving telecommunication signals on a communication line. The LIU can be located in the input/output part of a silicon chip. The operation of the LIU can include a digital state machine that converts an electromagnetic signal into another electromagnetic signal representative of a sequence of integers, e.g., HDB3 or B8ZS format (depending on the corresponding protocol). For example, an E1 symbol is represented by sixteen samples where each sample is in a range of 0 through 1023. These samples, which can be represented in 10-bit words, can be communicated to an analog frond end (AFE) part of the LIU. At the AFE part or another part in close proximity, a digital-to-analog converter (DAC) converts the 10-bit words to an analog differential electromagnetic signal, which a line driver, at least, communicates to the communication line.

When configured by a silicon chip the LIU can be instantiated many times (e.g., twenty-one times in the BCM85 chip also known as the PVG610 product) which can make it difficult to fit a respective result of each instantiation into a specific waveform mask (e.g., E1, T1, or J1 masks such as masks defined in ITU-T G.703). Furthermore, fitting the respective result can be especially difficult considering the various environmental and process variations affecting the LIU. Despite these and other complications, the LIU described herein can communicate a number of electromagnetic waveforms consistently fitting into a variety of specific waveform masks, such as masks defined by ITU-T G.703

Figure 1:
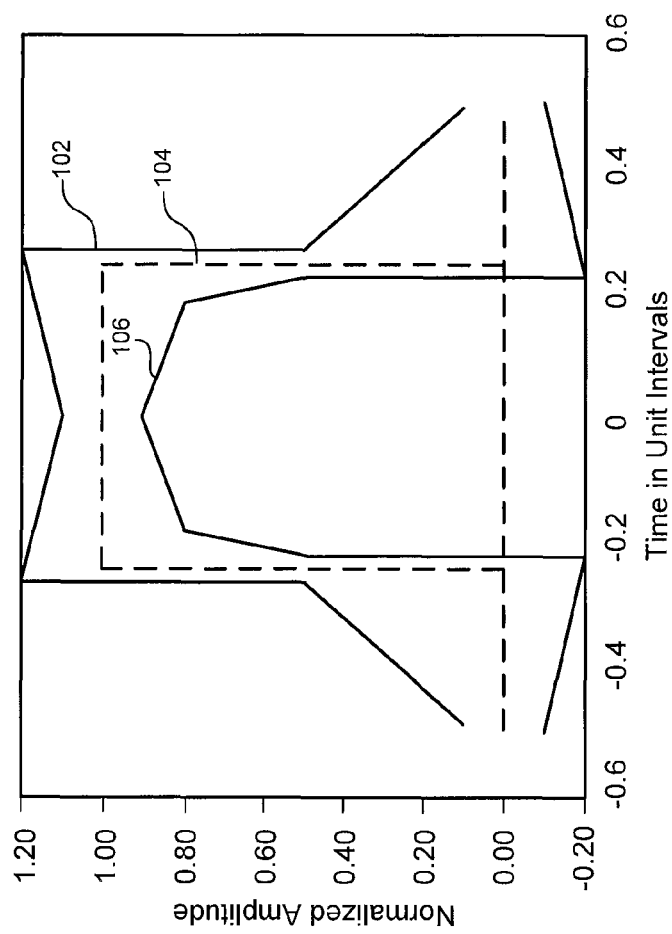
FIG. 1 is a graph of an example waveform mask.
Figure 2:
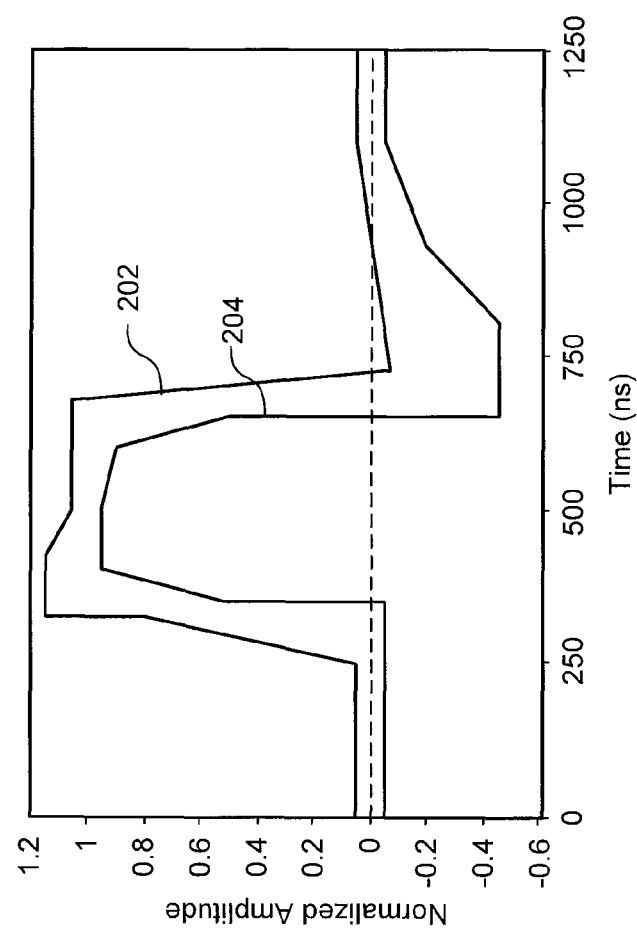
FIG. 2 is a graph of an example waveform mask.

FIGS. 1 and 2 are graphs of example waveform masks as defined by ITU-T G.703. The example masks can be normalized, such that the steady state voltage is designated as one. In FIG. 1, depicted is an example E1 waveform mask having an upper boundary 102, an ideal signal 104, and a lower boundary 106. In FIG. 2, depicted is an example T1 waveform mask having an upper boundary of 102 and a lower boundary of 104.

The LIU's ability to communicate a number of electromagnetic waveforms consistently fitting into the specific waveform mask, can be enabled by a transmit part of the LIU. Also, a feedback controller, such as controller 316, of the transmit part allows for modifying the waveforms to fit the specific mask. This feedback controller can compensate for variations of environmental conditions, such as temperature, supply voltage, line profile (with respect to resistance, capacitance, or inductance), and line impedance per protocol (e.g., impedances 75 ohm, 100 ohm, 110 ohm, and 120 ohm). In addition, the feedback controller can also compensate for various conditions on the silicon chip, such as doping variations and temperature. Also, this feedback controller allows for avoiding constant hardware modifications to the LIU for adjusting to different protocols or masks. It also enables the LIU to instantiate a great number of times, such as twenty-one times on the same die, where the transmit part performs the feedback controller independently for each instantiation. For each instantiation, the feedback controller modifies or compensates the output waveform independently, because there is a respective feedback controller for each instantiation of the LIU. Further, because of this flexibility, the feedback controller can adjust the waveform for different communication standards, such as E1, T1, and J1.

Also, a sampling point mechanism, which may be part of the digital state machine and utilizes a signal meas_now (described below), can ensure accurate sampling at a precise time of relevant levels of the outputted waveform (e.g., sampling at a time when a high level has stabilized). Such timing may be adjusted to an earlier or a later point in time, per protocol, or per mask. In some embodiments, the exact timing of a sampling point can be programmable, for higher flexibility and accuracy. Also, in some embodiments, a rate of occurrences of sampling events (e.g., a rate being defined by a ratio of a frequency of a sampling pulse to a frequency of a data symbol) can be also programmable. This rate can be different, for example, for a startup phase, where fast and coarse corrections are desired, or for a normal phase, where slower and more accurate corrections are desired. Also, in some embodiments, polarity of sampling can be utilized by a sign bit signal (e.g., a sign bit signal meas_pol described below). This sign bit ensures sampling at a correct polarity, and that with one sampling device, this circuit is capable of sampling both negative and positive polarity signals. This simplifies the circuit and design efforts.

Referring to the feedback controller, this controller can also include a comparator that compares the differential output voltage on the communication line (also referred to as the line) with a single-ended reference voltage. For example, using one comparator for various communication protocols, reference voltages, comparator windows, comparison resolution (fine tuning), simplifies the design and enables its flexibility. Also included, a reference voltage generator with an algorithmic state-machine and a digital encoder can generate the reference voltage. In some embodiments, the reference voltage generator can be capable of utilizing the following programmable parameters: a baseline reference voltage between 1.18 V and 2.7 V to fit the various target masks; fine tuning parameters in conjunction with the baseline voltage, such as increments of +/−0.7%; and a target signal comparison window, which can be between 0.7% and 2.8% of the reference voltage, e.g., in four steps. Also, the comparator can compare the output signal with either the low or high edge or the boundary of the target signal comparison window. Further, the aforementioned parameters can embody a programmable reference voltage that can cover an entire voltage range of a protocol (e.g., in steps as small as +/−9 mV, while still assuring minimum error). In some embodiments, the comparator's output can be a one-bit signal that indicates whether a comparison result can be true or false. This indication can be fed back to the algorithmic state-machine for fine tuning an output signal of the transmit part. In some embodiments, the state-machine can be realized by a digital part of the transmit part of the LIU. This may provide a benefit from utilizing an error-correction algorithm through a digital mechanism, which may be simpler to design and debug, and may also be flexible for making changes.

Figure 3:
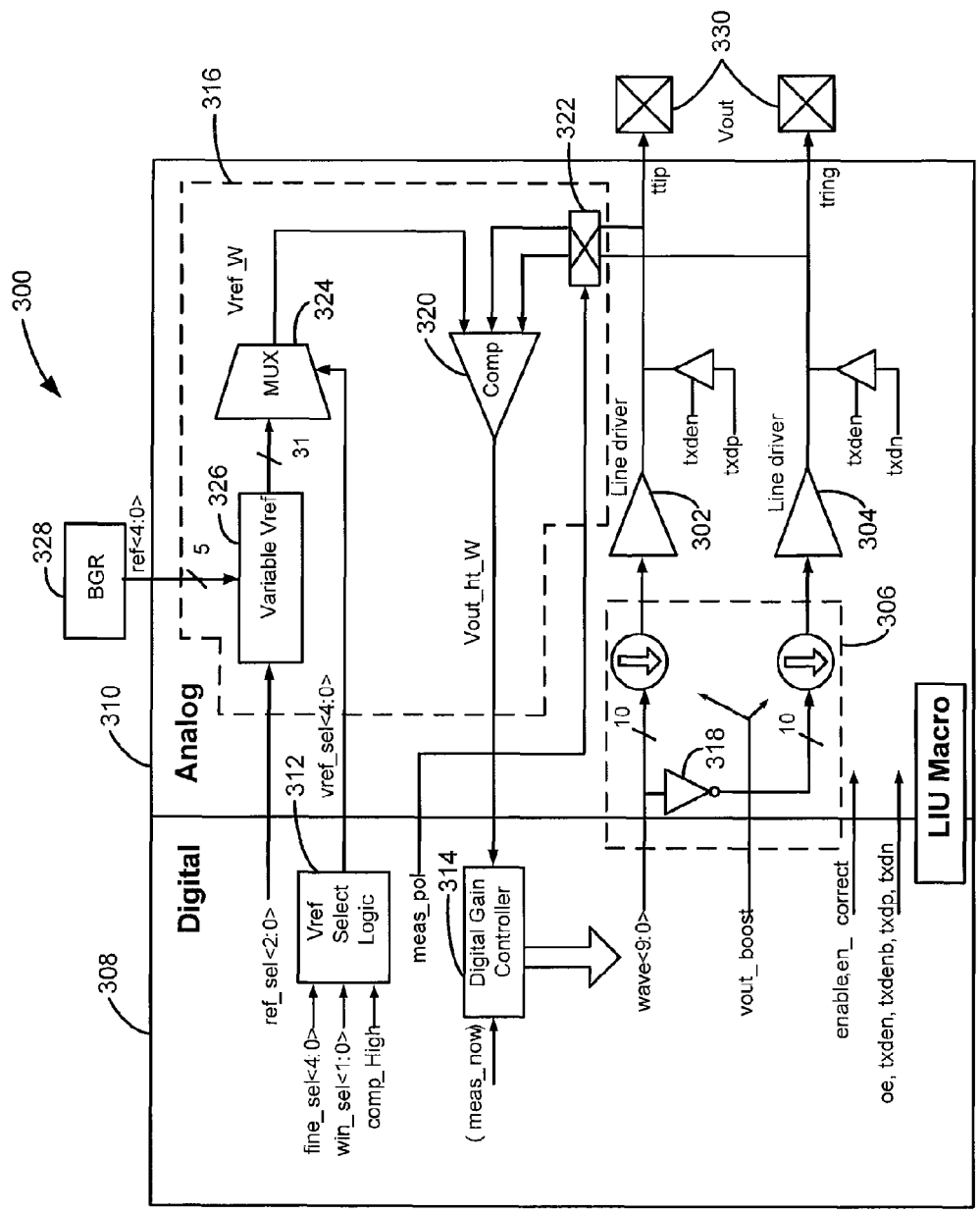
FIG. 3 is a block diagram of an example embodiment of a transmit part of an LIU.

In FIG. 3, depicted is a block diagram of an example embodiment of a transmit part 300 of the LIU. The transmit part 300 has two outputs, voltage signals ttip and tring. An output voltage signal Vout can be the voltage difference between these two outputs, and can be communicated via a communication line 330. Each of the two voltage signals ttip and tring can be driven by a respective line driver 302 or 304. A common voltage (e.g., 1.625 V), which can be half way between 0 volts and VDD, can be configurable so that a full range of available voltage swings of an analog part 310 can be utilized. To output a positive voltage for the voltage signal Vout, the voltage signal ttip can be driven to a voltage higher than the common voltage by an offset, and the voltage signal tring can be driven to a voltage lower than the common voltage by the same offset. To output a negative voltage for the voltage signal Vout, the opposite can be performed.

The LIU 300 also has a digital-to-analog converter (DAC) 306 having two outputs to each of the line drivers 302 and 304, and coverts a digital input signal, communicated via bus wave<9:0>, to analog voltage signals that can be communicated to the drivers. Digital words communicated via a bus wave<9:0> can be sampled by a clock, e.g., a 32.768 MHz clock, before or after being communicated to the transmit part 300. Where the clock can be a 32.768 MHz clock, an information symbol can be made up from sixteen samples, thus the information symbol can be sixteen words (each word having ten bits) evenly spaced in time (e.g., see FIGS. 4 and 5). Table 1 summarizes an example operation of the DAC 306.

TABLE 1

| Desired Vout (v) | wave<9:0> | V(ttip) (v) | V(tring) (v) | Vout = V(ttip) − V(tring) |
|---|---|---|---|---|
| +3.3 | 1023 | 3.300 | 0 | 3.3 |
| +1.5 | 743 | 2.370 | 0.870 | 1.5 |
| 0 | 512 | 1.625 | 1.625 | 0 |
| −1.5 | 281 | 0.870 | 2.370 | −1.5 |
| −3.3 | 1 | 0 | 3.300 | −3.3 |

In addition to the DAC 306, FIG. 3 depicts other components of the example embodiment of the transmit part 300. For example, the transmit part 300 can have a digital part 308 in addition to the analog part 310. Further, the analog part 310 and digital part 308 can have several pins, control buses, internal signals, and components for receiving and processing electromagnetic signals, which is described in this and subsequent paragraphs. For example, the components can include a select logic circuit 312 for a feedback reference voltage (Vref), a digital gain controller 314, the DAC 306, the two line drivers 302 and 304 (which can be respective positive and negative line drivers), and a feedback controller 316. As shown by FIG. 3 the digital part 308 can include the Vref select logic circuit 312 and the digital gain controller 314, whereas the analog part 310 can include the DAC 306, the two line drivers 302 and 304, and the feedback controller 316. Also, as shown, the DAC 306 can include a "not" gate 318 that facilitates the respective negative of the digital words being communicated to the respective negative line driver 304. The feedback controller 316 can include a comparator 320, one or more switches (e.g., a switch 322) and multiplexors (e.g., a multiplexor 324), and a variable Vref generator 326 that communicates with a band gap reference generator 328, which is external to the LIU, but still on the silicon chip.

With regard to the abovementioned pins and busses of FIG. 3, the voltage signals ttip and tring can be outputted via output pins to the communication line 330 and together they can output two bits in an analog electromagnetic signal. A bus ref<4:0> inputs reference voltages from the external band gap reference generator 328 to the variable Vref generator 326. The reference voltages from the external band gap reference generator 328 can be represented by five bits in an analog electromagnetic signal. A bus ref_sel<2:0> inputs code for selecting a nominal reference voltage to the variable Vref generator 326. The nominal (baseline) reference voltage can be represented by three bits in a digital electromagnetic signal. A bus vref_sel<4:0> inputs code for selecting a detailed reference voltage for comparison made by the comparator 320.

Such code can be inputted from the Vref select logic circuit 312 to the multiplexor 324, and it can be represented by five bits in a digital electromagnetic signal. Also, this bus acts as a control bus for selecting a reference voltage with respect to other controls internal to the digital part 308. Other controls internal to the digital part 308 can include buses fine_sel<4:0> and win_sel<1:0>, and an internal digital voltage signal comp_High. The bus wave<9:0> inputs code for building an output waveform of that can be communicated to the DAC 306, and this code can be represented by ten bits in a digital electromagnetic signal. Pin enable can input a one-bit digital signal that enables transmissions from the LIU. This pin can also be used to turn off the LIU or the transmit part 300 in a power save mode. As for pin en_correct, this pin can input a one-bit digital signal that facilitates activating and deactivating the feedback controller 316. Pin oe can input a one-bit digital signal that disables a bypass circuit (not depicted in FIG. 3) that bypasses the two line drivers 302 and 304. Respective pins txden_p and txden_n of the two lines drivers 302 and 304 can input a two-bit digital signal that enables the bypass circuit, and respective pins txd_p and txd_n can input a two-bit digital signal that represents data for a respective bypass mode.

Figure 14:
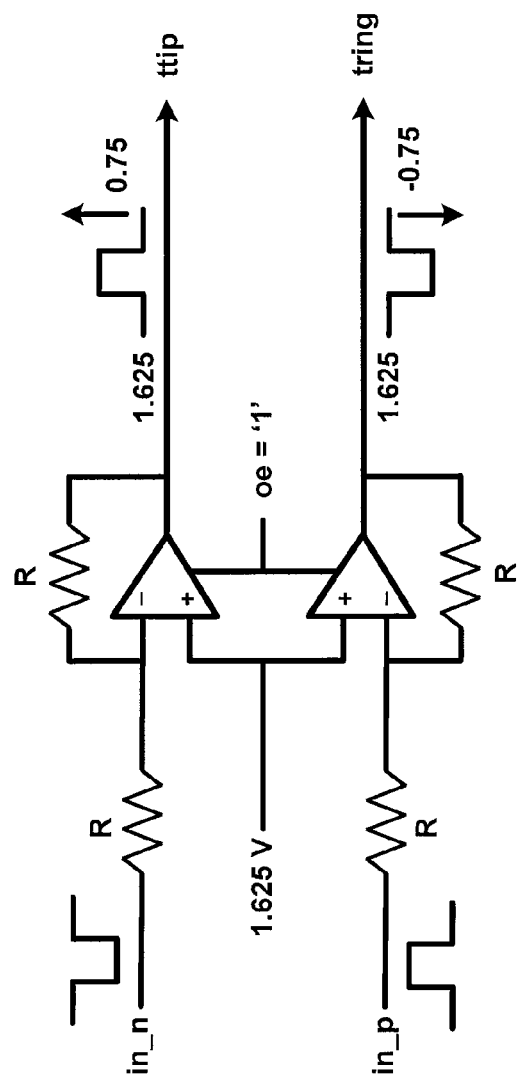
FIG. 14 is a schematic diagram of an example line driver of the transmit part depicted in FIG. 3 being operated in a normal mode.
Figure 15:
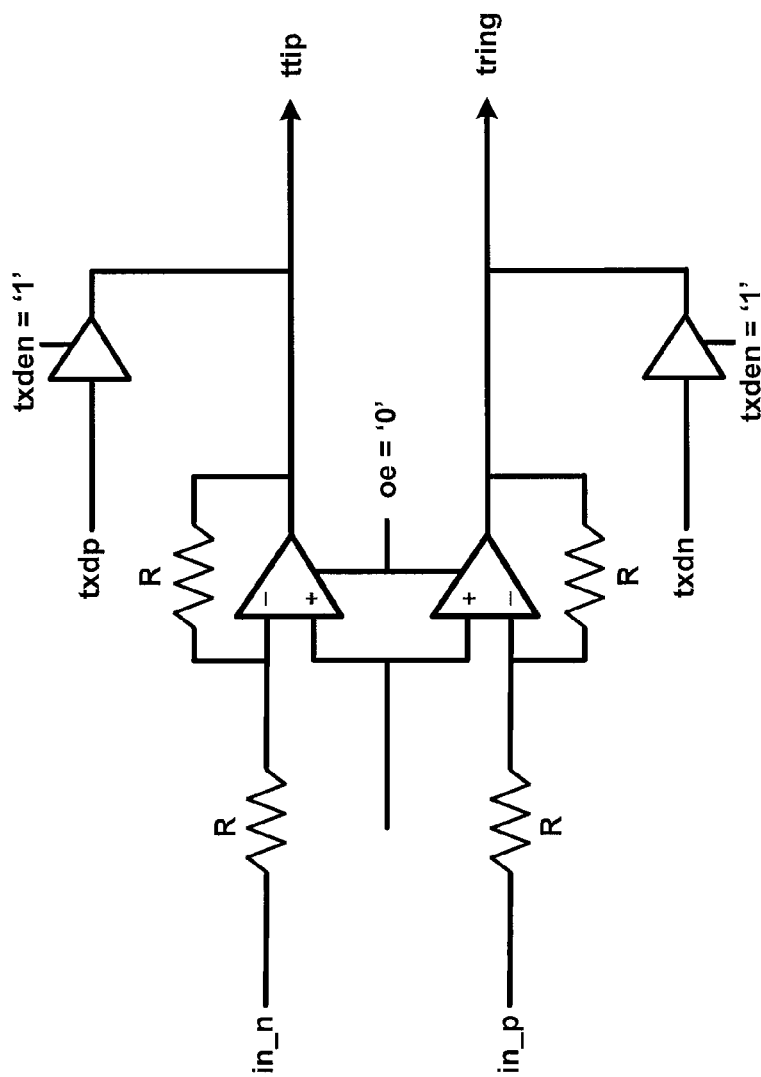
FIG. 15 is a schematic diagram of an example line driver of the transmit part depicted in FIG. 3 being operated in a bypass mode.

With respect to the normal and bypass mode of operation, FIG. 14 depicts a schematic view of the two example line drivers 302 and 304 in a normal mode of operation where the line drivers are not bypassed, and FIG. 15 depicts a schematic view of the same in the bypass mode. In some embodiments, the bypass mode disables the waveform generation, so that only binary signals are driven to the two outputs to LIU.

As mentioned, several of the pins, signals, and buses that are depicted in FIG. 3 can be internal to the digital part 308 of the LIU 300, including signals meas_pol, meas_now, and comp_High, busses ref_sel<2:0>, fine_sel<4:0>, win_sel<1:0>, and vref_sel<4:0>, and pins enable and en_correct. The signal meas_pol indicates to the comparator 320 whether an active pulse is positive or negative. The signal meas_now can be a one clock cycle pulse that can designate a time slot for when a measurement of a voltage signal Vout_H can be taken. The voltage signal Vout_H can be a steady state voltage level of the output waveform of the LIU 300, and the signal meas_now is to be activated when the output waveform on the communication line 330 can be stable.

Also depicted is a circuit Vout_boost, which can be a simple gain stage for the signal that can be eventually outputted by the transmit part 300.

Figure 4:
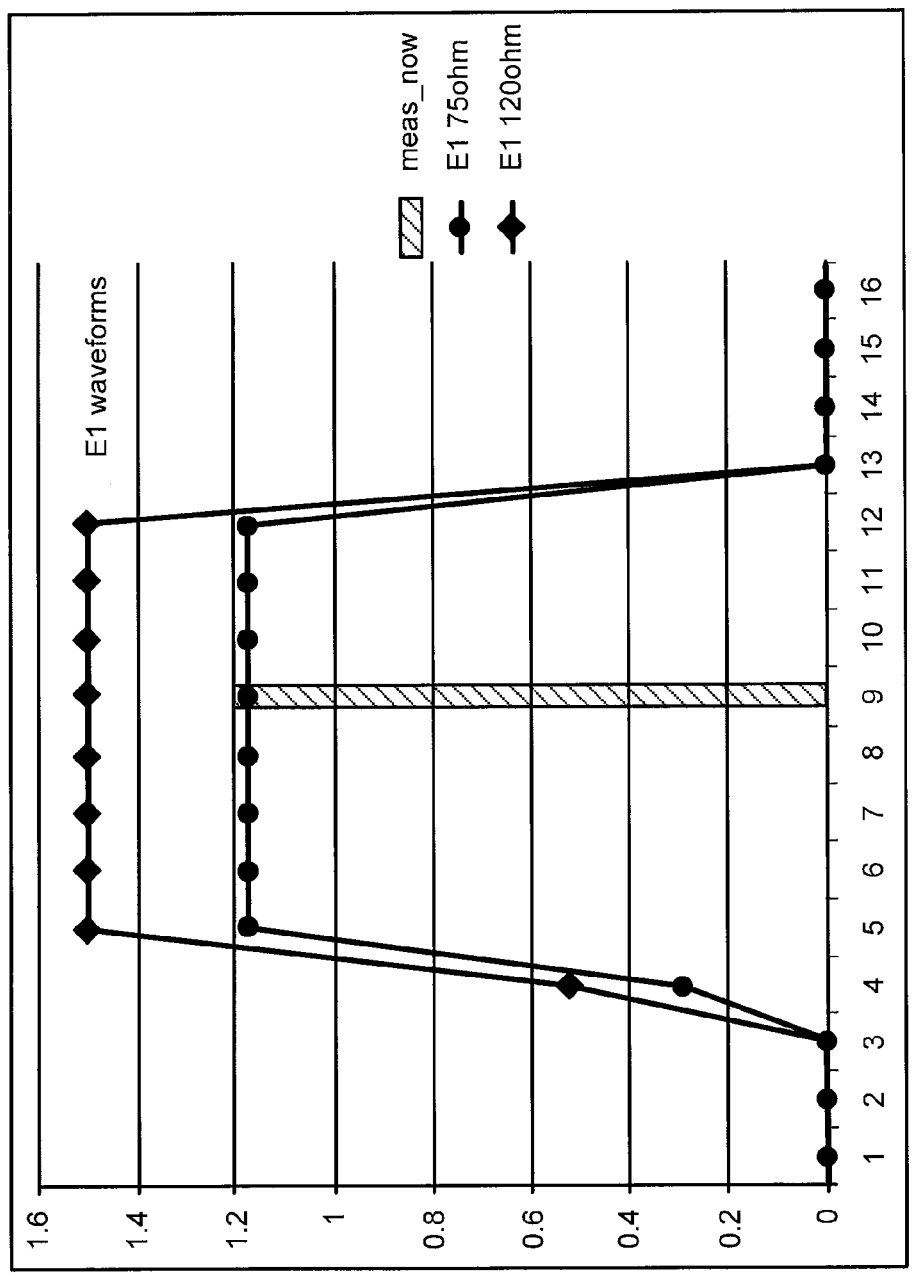
FIG. 4 is a graph of example waveforms and an example meas_now signal.
Figure 5:
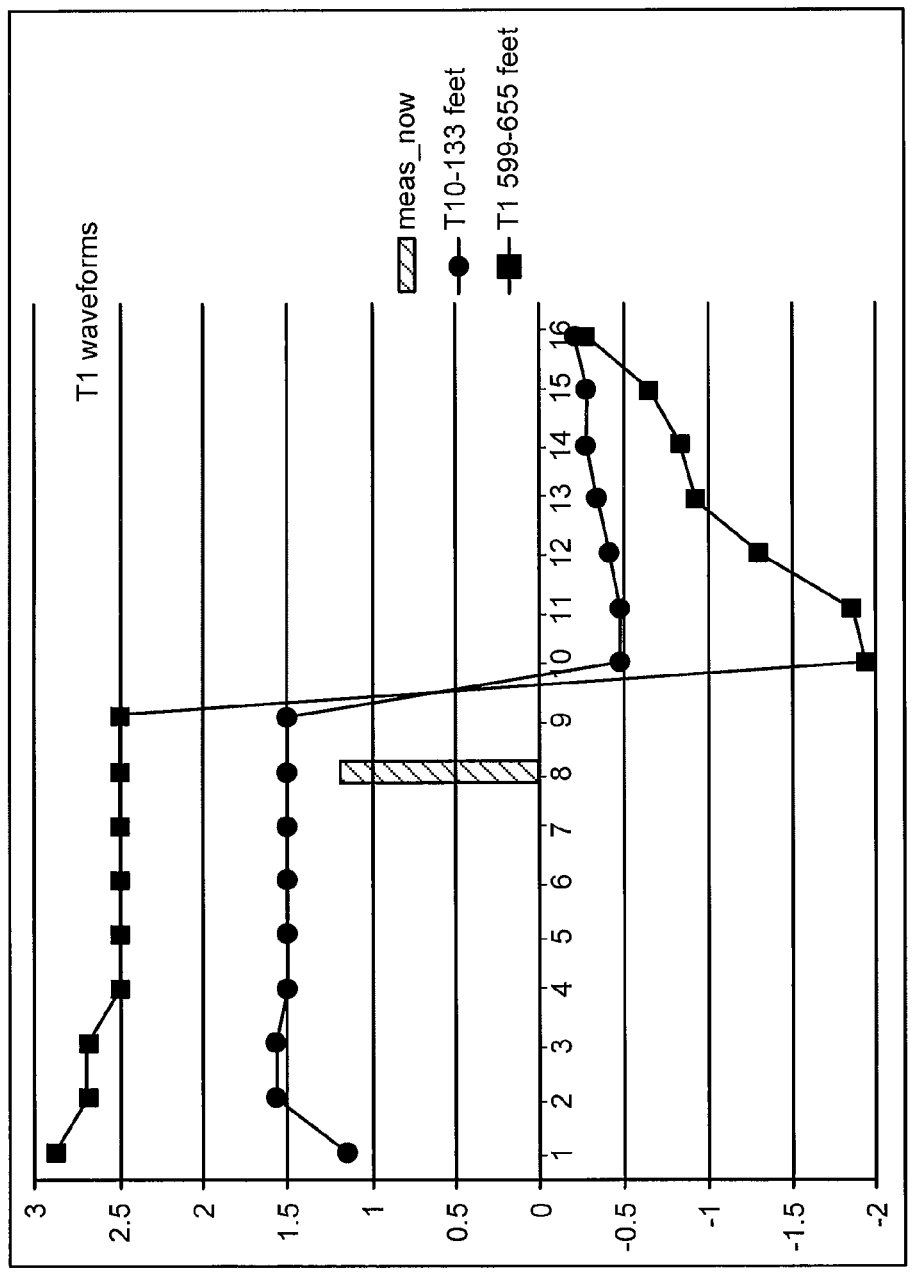
FIG. 5 is a graph of example waveforms and an example meas_now signal.

As shown by FIG. 4, the voltage signal Vout is at its optimal state at the middle of the mask, which is near the ninth sample. With respect to another mask, FIG. 5 illustrates that the signal Vout reaches its optimal state near the eighth sample. The timing of the pulse of the signal meas_now can be configurable, so that each of the cycles, e.g., sixteen cycles as shown in the figures, can be used to measure timing of the voltage signal Vout. Although, the timing should be measure during the expected steady state of the voltage signal Vout. Further, an occurrence rate of the digital part 308 can be configured at the rate that the signal meas_now occurs, where the occurrence rate defines the elapsed number of symbols, e.g., E1, T1, or J1 symbols, between consecutive occurrences of the pulse inputted by the signal meas_now. The occurrence rate can be a configurable parameter, where a larger interval between two occurrences of the pulse provides for higher stability at a cost of a slower rate to a desired output level.

As for the other pins and busses, the bus ref_sel<2:0> inputs code that determines which reference voltage the variable Vref generator 326 generates with respect to a corresponding protocol, e.g., E1, T1, or J1. Table 2 summarizes an example of such reference voltages selection.

TABLE 2

| ref_sel<2:0> | BGR output (V) |
|---|---|
| 000 | 1.25 |
| 001 | 1.5 |
| 010 | 1.8 |
| 011 | 2.2 |
| 100 | 2.7 |

Also internal to the digital part 308, the bus fine_sel<4:0> can input a 5-bit digital signal for fine-tuning the reference voltage, which can fine-tune in fifteen steps of 0.7%. Further, the bus win_sel<2:0> can input a 2-bit code for selecting a width of a comparison window for configuring the reference voltage.

External to the digital part 308, a component of the signal inputted by the bus vref_sel<4:0> represents a signal communicated by the bus win_sel<2:0>. Also represented by a component of the bus vref_sel<4:0> can be the signal comp_High, which can be internal to the digital part 308 as well and communicates which limit of the comparison window to use, the high or the low limit.

Figure 6:
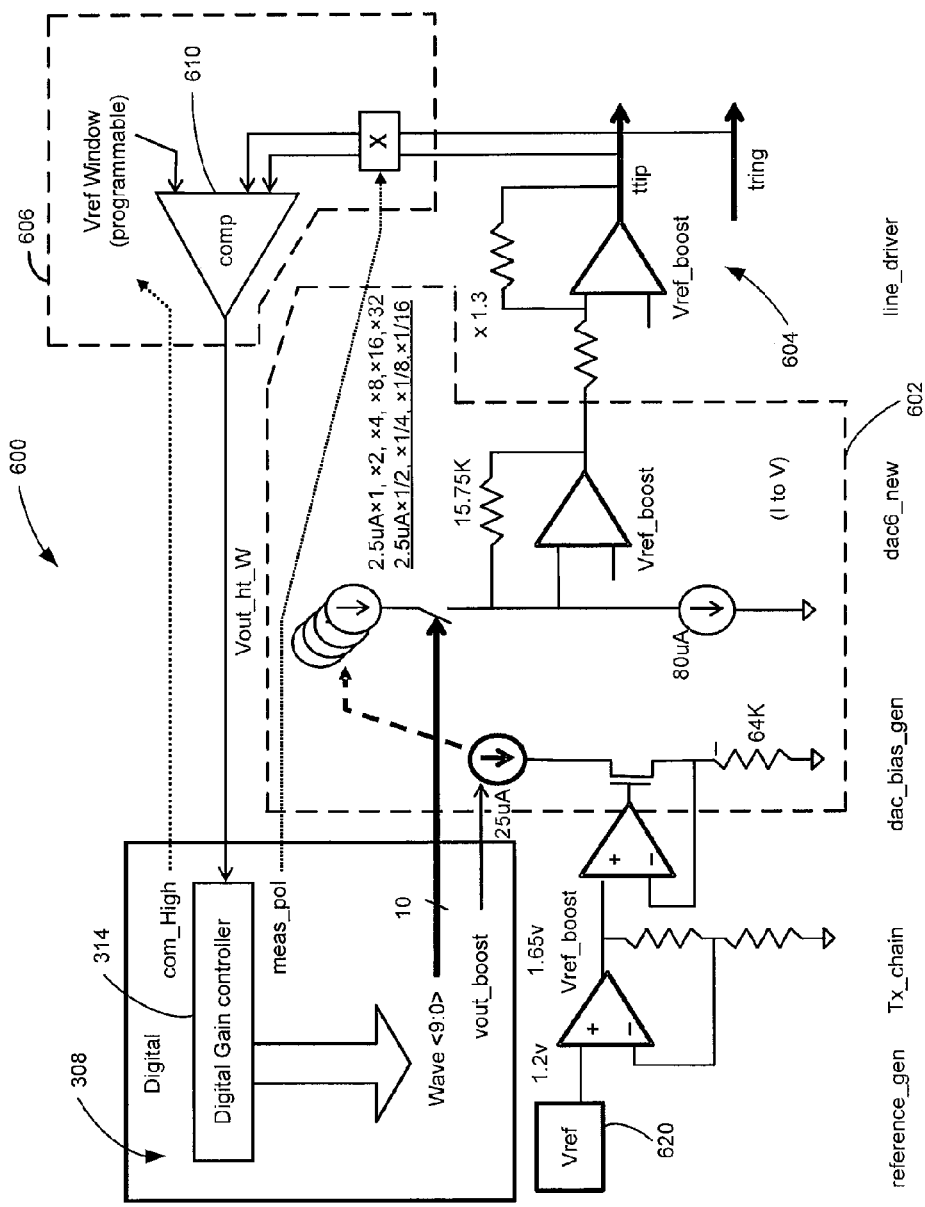
FIG. 6 is a block diagram of an example analog part of the transmit part depicted in FIG. 3.

Referring back to the analog part 310 of the transmit part 300, FIG. 6 is a block diagram of an example analog part 600 of the example transmit part 300 of FIG. 3. As mentioned above the analog part 600 includes a DAC 602, two line drivers 604 (only one depicted), and a feedback controller 606. The bus wave<9:0> inputs a 10-bit digital word into the DAC 602, which uses the digital word to construct a desired waveform (e.g., see FIGS. 4 and 5), such as a HDB3 waveform or a B8ZS waveform, that can be outputted to the communication line 330 via the signals ttip and tring. The bus wave<9:0> can define a value in the range 0 through 1023, and this value can be translated into electromagnetic current by the DAC 602, which can be a current-steering DAC, such as the DAC depicted in FIG. 13. This current can be converted to a differential voltage by an output stage of the two line drivers 302 and 304 (or the two line drivers 604). At each cycle of the clock, the transmit part 300 issues a new value to the bus wave<9:0>. Thus, a sample that represents a value in the range 0 through 1023 can be generated at each clock cycle. For example, a symbol rate for protocol E1 can be 2.048 Mbit/sec, hence in each symbol there can be sixteen cycles of a 32.768 MHz clock.

With respect to the feedback controller 606, the differential output voltage at its steady state and at its positive edge can be designated by a voltage signal Vout_H. Thus, the voltage signal Vout_H can be defined as the signal Vout at its steady state level. The signal Vout_H can be measured periodically, and compared to a reference voltage 620 by a comparator 610. The reference voltage 620 can be programmable per port (a port being one instantiation of the LIU), such that it corresponds to the appropriate voltage level, according to the protocol in use (e.g., protocol E1, T1, or J1). The result of the comparator's 610 comparison can be a digital voltage signal Vout_ht_W, where the digital voltage signal indicates whether the signal Vout_H can be higher or lower than a desired voltage according to the protocol in use. A digital voltage signal Vout_ht_W can be fed back to the digital part 308 of the LIU 300, where the digital part having a correction algorithm adjusts the input signal to the DAC 602, which is the bus wave<9:0>. This adjustment can be done in small steps, in order to adjust the signal Vout_H in small steps as well.

Figure 7:
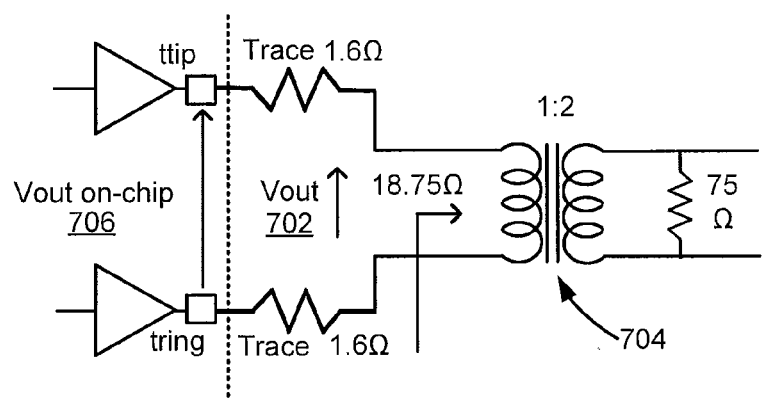
FIG. 7 is a diagram that illustrates a possible impact of signal copper traces on packaging of the transmit part depicted in FIG. 3 and surrounding components.

Regarding the feedback controllers 316 and 606, feedback controller for achieving high accuracy of the voltage signal Vout can be based on the concept of measuring the signal before it leaves the transmit part 300, and correcting accordingly. However, there is a factor that cannot be corrected by the feedback controllers 316 and 606. This is the impact of signal copper traces on packaging of the transmit part 300 and surrounding components. The effect of the traces is illustrated in FIG. 7, where it is depicted that attenuation of the voltage signal Vout is caused by the traces. Due to this effect, an actual voltage level 702 seen by a transformer 704 is lower than a voltage signal Vout 706 prior to leaving the transmit part 300.

The attenuation can be as high as 1.3 dB (or 14%), according to the following calculation: Maximum Vout Loss=(1.6+1.6)/(1.6+18.75+1.6)=14%. To compensate for this error, the following steps can be configured by the transmit part 300: measure the exact resistance of the traces, e.g., one time in the lifetime of a LIU; calculate the factor of attenuation; and use the factor of attenuation as a constant parameter to adjust the voltage signal Vout upwards. However, the adjustment upwards may not be done through the input of the bus wave<9:0>. The feedback controller 316 or 606 adjusts it downwards to its effected state. Therefore, the adjustment can be performed on a reference voltage (e.g., the reference voltage 608) directly, and then the feedback controller (e.g., the feedback controller 316 or 606) adjusts the input to the bus wave<9:0> accordingly. To achieve this, the reference voltage is tunable to any value within an entire working range of a protocol being used, and optimally the reference voltage can be tunable to any value within all used protocols (e.g., E1, T1, and J1). Also, the tuning should be performed in relatively small steps (e.g., see FIG. 8).

Figure 8:
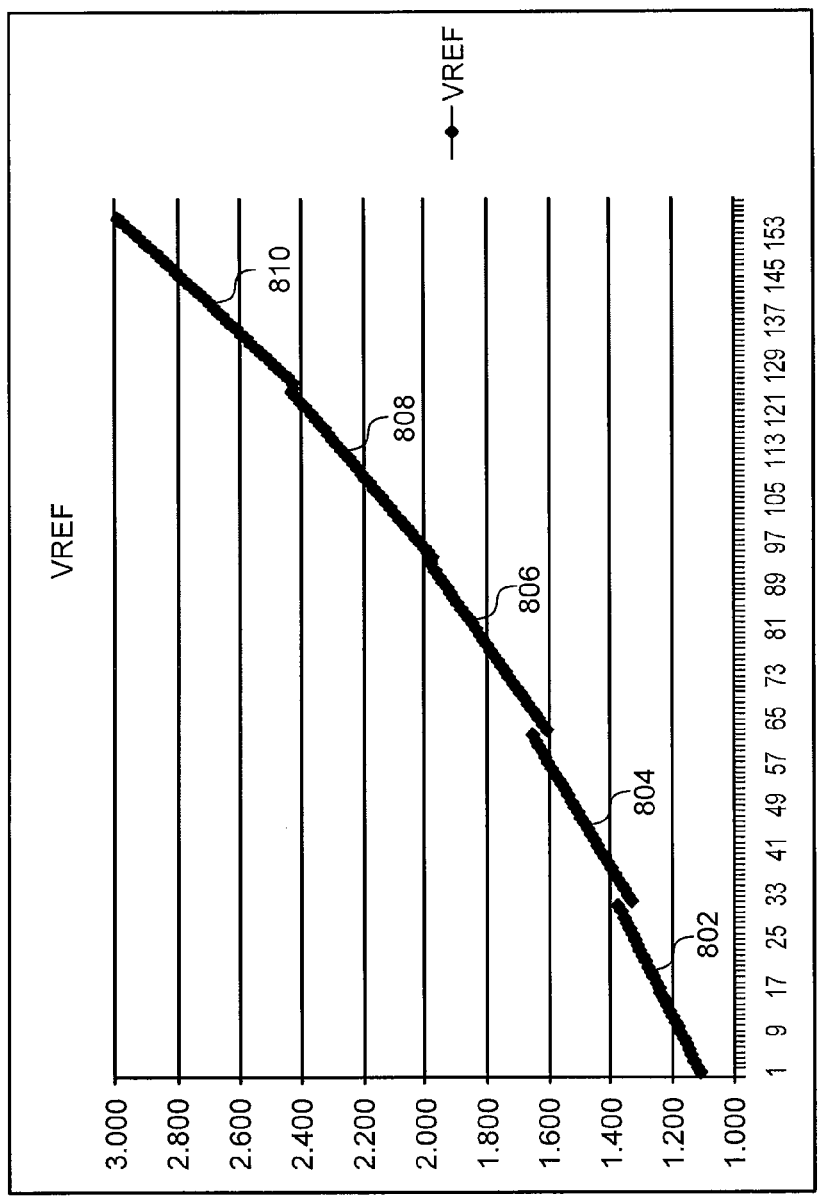
FIG. 8 is a graph that illustrates possible results of five different example reference outputs from an example band gap reference generator.

In FIG. 8, a graph illustrates results of five different example reference outputs from a band gap reference generator (e.g., the external band gap reference generator 328). The outputs can make +/−15 steps at 0.7% for each step, where the entire range of voltages can be between at least 1.25 V and 2.5 V. The maximum quantization error can be ½ of a step, which can be 5 mV for the 1.25 V reference, and 9 mV for the 2.5 V case, at most. As shown in the graph, there are five regions 802-810, generated by five reference voltages; and there are thirty points, up and down, from the center of each region. To achieve these results, a reference voltage generator (e.g., the variable Vref generator 326), can have thirty-one output pins with the following voltage levels: one pin has a nominal level, e.g., 1.5 V; and thirty modifications of the nominal level have evenly spaced small increments or decrements (e.g., at 1.5 V the modified versions shall be as follows: 1.5 V+/−0.7%, 1.5 V+/−1.4% and so on, up to: 1.5 V+/−10.5%).

Figure 9:
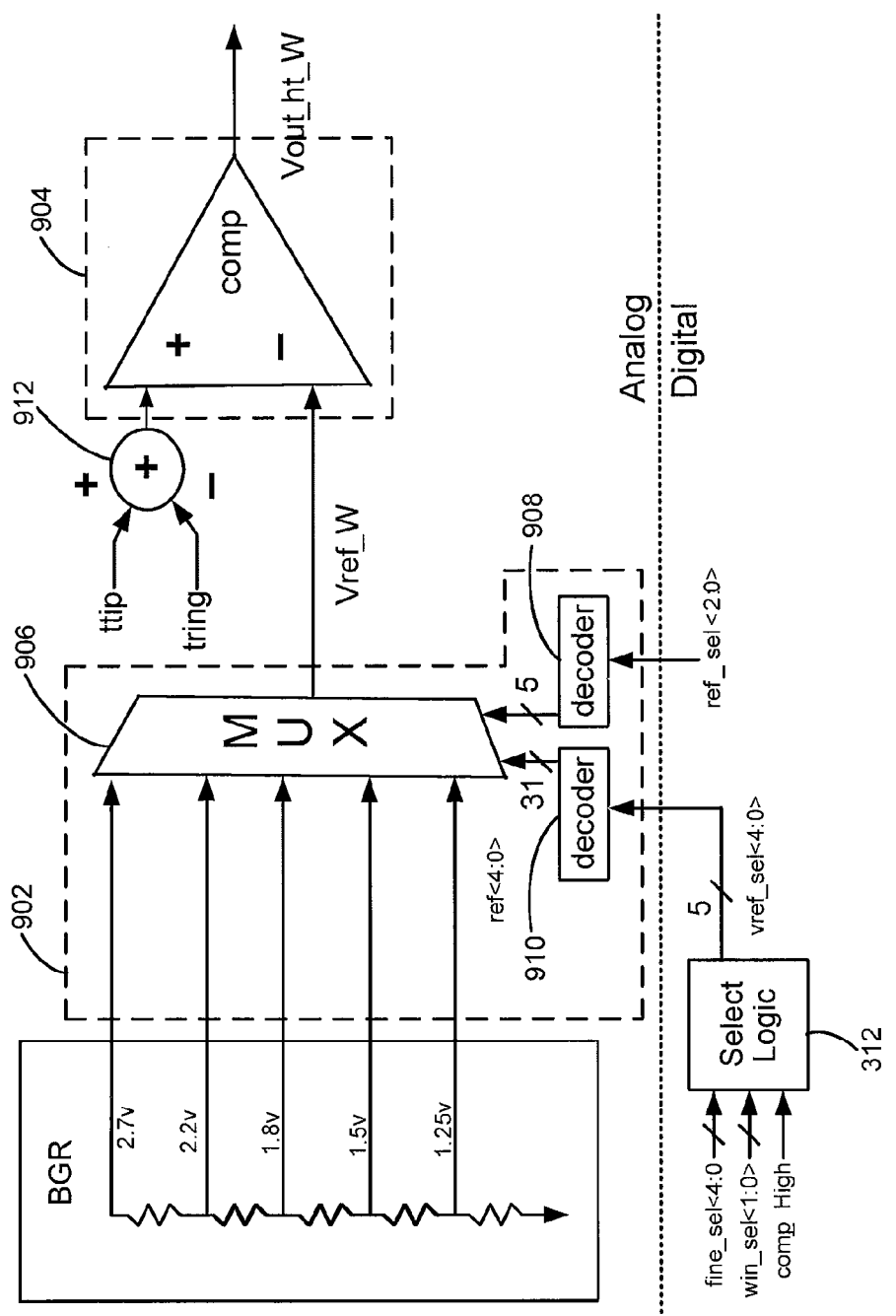
FIG. 9 is a block diagram of an example reference voltage generator and an example comparator similar to respective parts of the transmit part depicted in FIG. 3.

In FIG. 9, depicted is a block diagram of an example reference voltage generator 902 (similar to the variable Vref generator 326) and a comparator 904 (similar to the comparator 320). Connected to the reference voltage generator 902 can be a band gap reference generator, e.g., the external band gap reference generator 328, that generates a set of band gap reference voltages. Also depicted is a multiplexor 906, which can be part of the reference voltage generator 902. The multiplexor 906 uses a signal from a bus ref_sel<2:0>, which can be decoded by a first decoder 908, to select the band gap reference voltage, according to a protocol in use (e.g., E1, T1, or J1 protocols). In addition, the multiplexor 906 can use the bus vref_sel<4:0>, which can contain a binary code. This binary code can represent logic of the following parameters of the LIU: a baseline voltage signal for fine tuning, the comparison window, and a higher or lower edge of the comparison window. The bus vref_sel<4:0> may be decoded by a second decoder 910. Logic circuit 312 may be the source of the bus vref_sel<4:0>. The bus vref_sel<4:0> may be used by the multiplexer 906 to select an appropriate reference voltage for the comparator 904.

Further, inside the multiplexor 906, there can be a resistor ladder with thirty-one pins. Each of the pins can be a version of the baseline voltage signal with different offsets. The bus vref_sel<4:0> facilitates selection of one of the thirty-one pins. Also, the selection can be further facilitated by a fine-tuning mechanism defined by the bus fine_sel<4:0>, a window sizing mechanism defined by the bus win_sel<1:0>, and by the signal comp_High that communicates whether the boundary of the window is defined by high and/or low edge.

All of which can be inputs to the Vref select logic circuit 312, and thus, when combined, may produce a value of the bus vref_sel<4:0>.

With respect to the size of comparison window, such can be controlled by the resistor ladder in the multiplexor 906. Also, the window size can be defined by an upper limit Win_H, and a lower limit Win_L, where both parameters can be programmable. In addition, the signal comp_High can be used in order to designate which window edge, the higher edge Win_H, or the lower edge Win_L, must be compared against the output result signal. In general, the size of the comparison window can be either: one, two, three, or four steps at 0.7% from the respective voltage reference; and this size can be selected by the control bus win_sel<1:0>. Table 3 summarizes the operation of the control bus win_sel<1:0>.

TABLE 3

| win_sel<1:0> | Win_L | Win_H |
|---|---|---|
| 00 | Vref | Vref + 0.7% |
| 01 | Vref − 0.7% | Vref + 0.7% |
| 10 | Vref − 0.7% | Vref + 1.4% |
| 11 | Vref − 1.4% | Vref + 1.4% |

Figure 10:
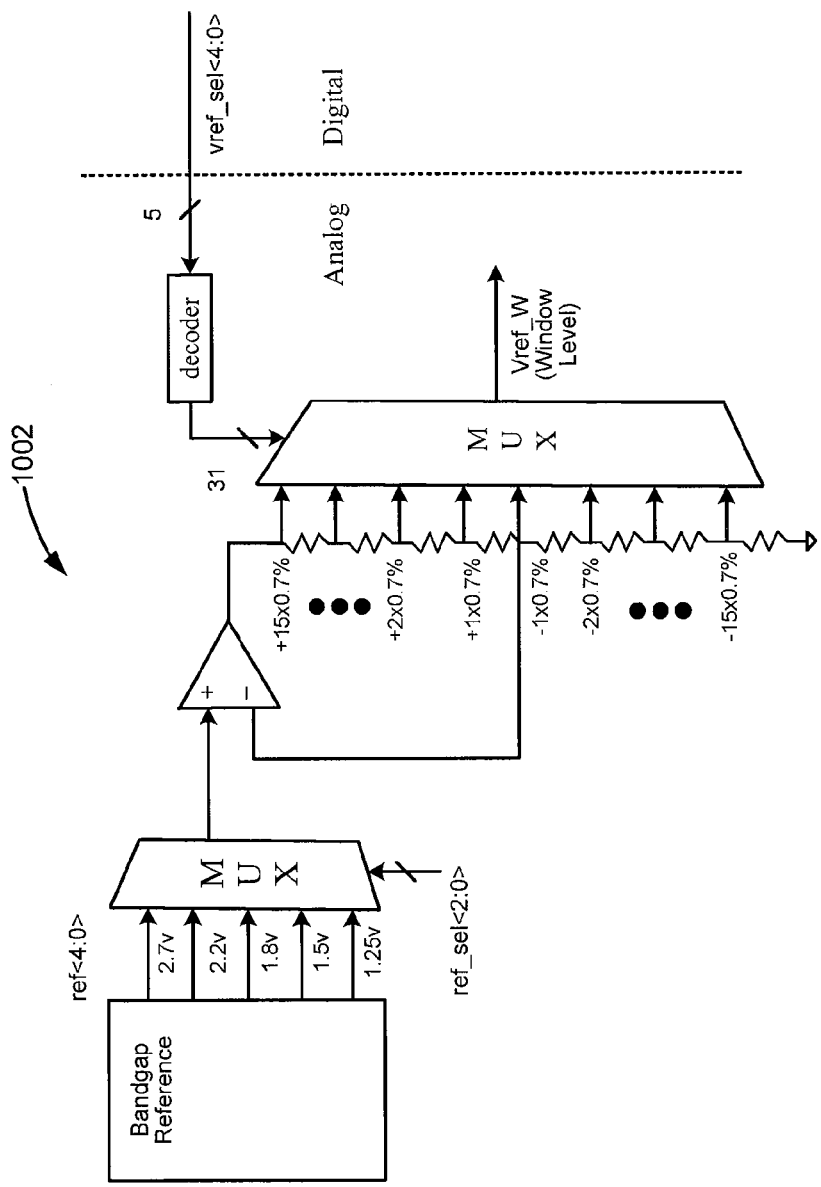
FIG. 10 is a block diagram of an example band gap reference generator similar to the band gap reference generator depicted in FIG. 3.

In FIG. 10, depicted is a block diagram of another example reference voltage generator 1002 (similar to the variable Vref generator 326 and the reference voltage generator 902). Although the variable Vref generator 326 combined with other components makes up reference voltage control of the transmit part 300 in FIG. 3, it is to be understood that the components depicted in FIGS. 9 and 10 can also make up the reference voltage control of the transmit part 300 of FIG. 3.

Referring back to the comparator 904 of FIG. 9, this component compares the difference of the voltage signals ttip and tring to a reference voltage Vref_W, which can be an end result of the comparison window described above. The difference of the voltage signals ttip and tring (e.g., the voltage signal Vout), can be a result of a subtraction circuit, such as a subtractor 912; and the output of the comparator 904 can be the voltage signal Vout_ht_W. Table 4 is a truth table of the output of the comparator 904.

TABLE 4

| Condition | Vout_ht_W |
|---|---|
| V(ttip) − V(tring) >= Vref_W | 1 |
| V(ttip) − V(tring) < Vref_W | 0 |

Further, the voltage signal Vout_ht_W can be fed back to the digital part 308 of the transmit part 300. This voltage signal can serve as an indication that the voltage signal Vout_H has reached or exceeded the desired Vref_W. The digital part 308 then adjusts the signal outputted by the bus wave<9:0>, in small steps, to increase or decrease Vout_H.

Also, Referring back to the decoders 908 and 910 of FIG. 9, the first decoder 908 can be a 3-to-5 decoder described by the truth table below (Table 5), and the second decoder 910 can be configured in a similar way to the first decoder 908, except it has five input bits as opposed to three input bits. As shown in FIG. 9, the second decoder 910, which can be a 5-to-31, decodes the five-bit input from the bus vref_sel<4:0>, and outputs the thirty-one output controls for the multiplexor 906. Whereas the 3-to-5 decoder 908 decodes the three-bit input from the bus ref_sel<2:0> and outputs the five output controls for the multiplexor 906.

TABLE 5

| ref_sel<2:0> | sel4 | sel3 | sel2 | sel1 | sel0 |
|---|---|---|---|---|---|
| 000 | 0 | 0 | 0 | 0 | 1 |
| 001 | 0 | 0 | 0 | 1 | 0 |
| 010 | 0 | 0 | 1 | 0 | 0 |
| 011 | 0 | 1 | 0 | 0 | 0 |
| 100 | 1 | 0 | 0 | 0 | 0 |

With reference to the 5-to-31 decoder of FIG. 9, like the first decoder 908, only one output of the thirty-one select outputs of the second decoder 910 can be active at any time. By default when signal communicated by the bus fine_sel<4:0> equal '00000', an active output can be output number sixteen, which is the middle output of the thirty-one outputs. For values communicated by the bus fine_sel<4:0> other than the default, the index of the selected output can be determined according to the following equation: the selected output=16+ Dec_value(fine_sel<4:0>), where Dec_value can be the translation of output of the bus fine_sel<4:0> in 2's complement format to decimal format. Also, the selection of the active output can be further determined by communications from the bus win_sel<1:0> and the signal comp_High, according to the following logic (See FIG. 11 for a table summarizing the following logic).

For simplicity, the assumed default value of the bus fine_sel<4:0> can be '00000'. If the bus win_sel<1:0>='00', which means a minimum window width of 1 step, then comp_High='0' causes the selection of output no. 16 (the Default), while comp_High='1' causes the selection of output no. 17 (one step Up from the Default). If the bus win_sel<1:0>='01', which means a window width of 2 steps, then comp_High='0' causes the selection of output no. 15 (one step Down from the Default), while comp_High='1' causes the selection of output no. 17 (one step Up from the Default). If the bus win_sel<1:0>='10', which means a window width of 3 steps, then comp_High='0' causes the selection of output no. 15 (one step Down from the Default), while comp_High='1' causes the selection of output no. 18 (2 steps Up from the Default). If the bus win_sel<1:0>='11', which means a window width of 4 steps, then comp_High='0' causes the selection of output no. 14 (2 steps Down from the Default), while comp_High='1' causes the selection of output no. 18 (2 steps Up from the Default).

Figure 12:
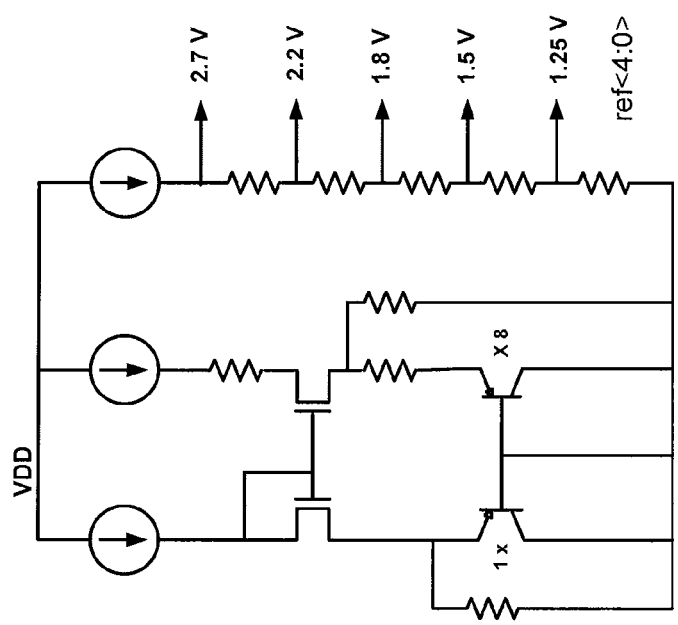
FIG. 12 is schematic diagram of an example band gap reference generator, similar to the external band gap reference generator depicted in FIG. 3.

In FIG. 12, depicted is a block diagram of an example band gap reference generator, such as the external band gap reference generator 328 depicted in FIG. 3. This and other band gap reference generators can be external to the LIU, so that only one band gap reference generator is needed for multiple instances of the LIU. This allows for inputting the exact same band gap reference signals in order to minimize the differences in the voltage signal Vout downstream for each instance of the LIU. For example, in the case of the PVG610 chip, where there can be twenty-one instances of the LIU, meeting a protocol mask is much more likely with a consistent band gap reference signal being inputted in to all of the twenty-one instances. However, because the physical distance between LIU ports on the chip can be large, multiple instances of the band gap reference generator can be used, such as three to four instances can be used in the case of twenty-one instances of the LIU. This has been found to meet the purpose of the band gap reference generator, which is to generate a constant reference voltage, which can be independent of the LIU, power supply voltage, temperature, physical location, and other qualities of the chip that configures the LIU.

In one embodiment of the LIU, the band gap reference generator has four reference outputs so to accommodate full coverage of a desired voltage range, such as from 1.12 to 2.98 volts. This is in accordance the voltage reference control of FIGS. 3, 9, and 10. The maximum variation allowed on each output, across all conditions, can be ±3%. In this embodiment, it has been found that a 2.7 V output is too high to achieve without a dedicated driver. For this reason, 2.7 V can be generated outside of the band gap reference generator and inside the LIU. Although this may create a great amount of error at the 2.7 V reference, this error in most cases can be acceptable in the T1 protocol, which is known to have greater tolerance than the E1 protocol.

As mentioned above, the reference voltage can be programmable, and at least in some embodiments the reference voltage can be programmable with respect to the band gap reference voltage. As per FIG. 9, the output of the reference voltage generator 902 can be the voltage signal Vref_W, which can be the selected output as a function of the following control inputs and the maximum error allowed on the voltage signal Vref_W (e.g., maximum error allowed is ±10 my for E1 120Ω, ±15 mV for E1 75Ω, and ±30 mV for T1). The following equations provide the minimum and maximum Vref_W: Vref_W minimum=Vref_bg×{1+[fine+select_win]×0.7%}−err_ref, and Vref_W maximum= Vref_bg×{1+[fine+select_win]×0.7%}+err_ref, where: Vref_bg is an array of reference voltages generated by the band gap reference generator and Vref_bg(0, 1, 2, 3, 4)=1.25, 1.5, 1.8, 2.2, 2.7 volts; fine=decoding from binary to decimal of an output of the bus fine_sel<4:0> in 2's complement (e.g., '00000'=0, '00001'=1, '11110'=−1); err_ref=10 my for E1 120Ω, err_ref=15 my for 75Ω, and err_ref=30 my for T1; and select_win is defined by the following table, Table 5:

TABLE 5

| win_sel | Comp_High | select_win |
|---|---|---|
| 00 | 0 | 0 |
| 00 | 1 | +1 |
| 01 | 0 | −1 |
| 01 | 1 | +1 |
| 10 | 0 | −1 |
| 10 | 1 | +2 |
| 11 | 0 | −2 |
| 11 | 1 | +2 |

Figure 13:
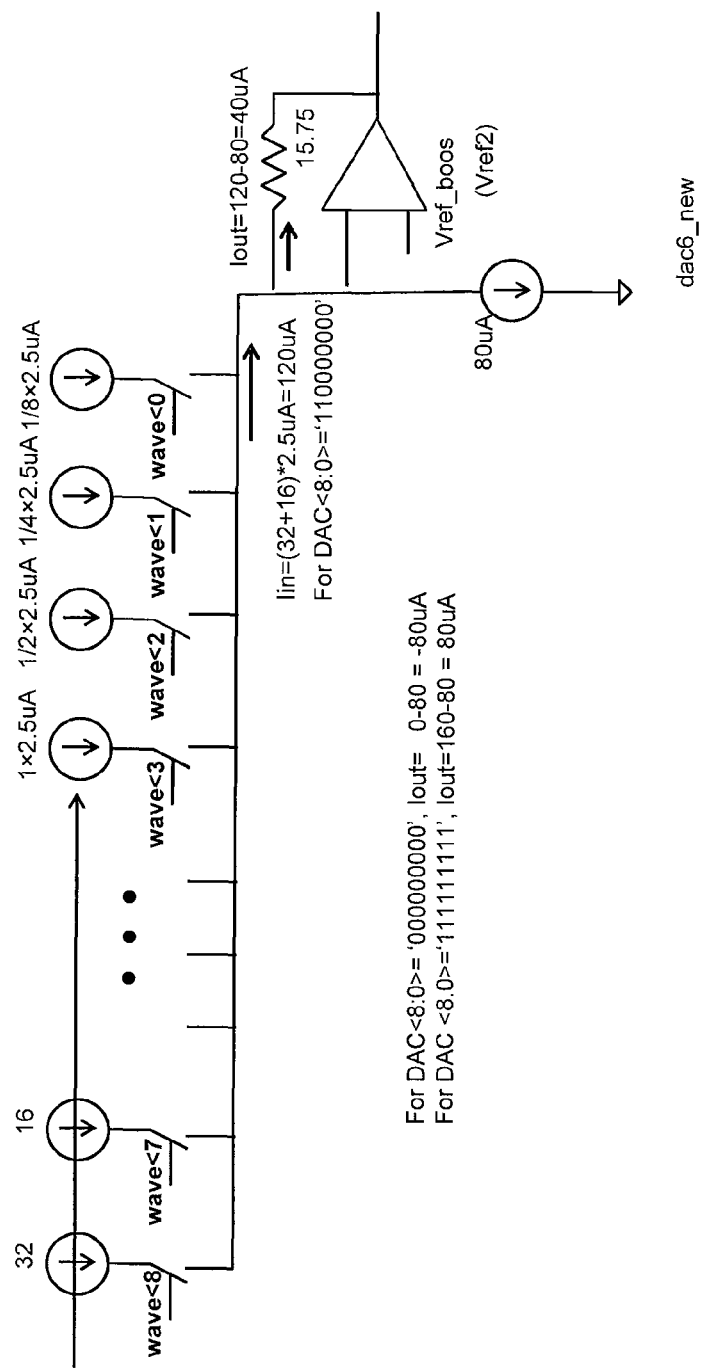
FIG. 13 is a block diagram of an example digital-to-analog converter (DAC) of the transmit part depicted in FIG. 3.

With final reference to FIGS. 3, 6 and 13, also depicted are instances of a circuit Vref_boost (see FIGS. 6 and 13), which can be a simple gain stage for the reference signal and/or the signal that can be eventually outputted by the transmit part 300.

With respect to calibration of at least the transmit part of the LIU, at startup, the LIU transmits a series of 1's in a communications format, e.g., E1 format. In synchronization with this output, the signal meas_now (which can be a pulse) can be sent one or more times, with a time interval between each instance of the pulse. The time interval between each pulse can be programmable for better flexibility.

With respect to the stability of the feedback controller, it should be stable under all conditions to operate correctly. A scenario, in which the loop could be unstable, can be in a case that there is a large correction, after which the output overshoots or undershoots. Therefore, the feedback loop in the LIU utilizes a lead-lag error detector, which is different from a phase-locked loop detector that produces signals proportional to the magnitude of error. In the LIU, the corrections can be done one step at a time and the lead-lag error detector enables such functionality. It does this by ensuring the correction step is smaller than a respective comparison window.

With respect to immunity from a short, the LIU transmit part should be able to sustain a case where its two outputs are shorted together, without damage. In practice, the transmit part can sustain shorts without a short-circuit detector. This is because the short-circuit current, usually, is much less than the current at the output stage of transistors at saturation. Therefore, in some embodiments of the transmit part, a short-circuit detector is not included.

With respect to testing the LIU, an analog loopback feature can be configured. This analog loopback feature may enable self-testing of the LIU by feeding analog data back to a receiver part of the LIU.

In view of the above detailed description and associated drawings, it should be apparent that such other modifications and variations may be effected without departing from the spirit and scope of the invention.

The methods, devices, and logic described herein may be configured in many different ways in many different combinations of hardware, software or both hardware and software. For example, all or parts of the transmit part may include circuitry in a controller, a microprocessor, or an application specific integrated circuit (ASIC), or may be configured with discrete logic or components, or a combination of other types of circuitry. All or part of the logic may be configured as instructions for execution by a processor, controller, or other processing device and may be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk.

While various embodiments of the invention have been described, many more embodiments and implementations are possible within the scope of the invention. Accordingly, the invention is not to be restricted except in light of the attached claims and their equivalents.

What is claimed is:

1. Line interface unit (LIU) circuitry, comprising:
   first and second instantiations of the LIU circuitry, including:
   respective first and second transmit parts, including:
   respective first and second feedback controllers, each configured to:
   receive output waveforms, the output waveforms outputted to a telecommunications line by the LIU circuitry;
   receive an indication of a line impedance of the telecommunications line, the indication of the line impedance outputted from a device configured to measure the line impedance of the telecommunications line; and
   control feedback to modify the output waveforms to fit a mask of a communication protocol, according to the received output waveforms and the indication of the line impedance; and
   respective first and second gain controllers communicatively coupled to the first and second feedback controllers, respectively, each of the first and second gain controllers configured to perform the modification of the output waveforms according to the controlled feedback.

2. The LIU circuitry of claim 1, wherein the first and second feedback controllers are each further configured to control the feedback according to an environmental condition, and wherein the environmental condition includes a supply voltage of the LIU circuitry, a capacitance of the telecommunications line, an inductance of the telecommunications line, a doping variation of the LIU circuitry, a temperature of the LIU circuitry, or any combination thereof.

3. The LIU circuitry of claim 1, wherein the line impedance depends on the communication protocol.

4. The LIU circuitry of claim 1, wherein the first and second feedback controllers are each further configured to compensate for a hardware modification.

5. The LIU circuitry of claim 4, wherein the hardware modification comprises changing the mask to an other mask of an other communication protocol.

6. The LIU circuitry of claim 1, wherein the communication protocol includes a protocol for time-division multiplexed voice signals.

7. A system, comprising:
   line interface unit (LIU) circuitry, including a line output configured to output respective output waveforms of multiple instantiations of the LIU circuitry to a telecommunications line;
   a first instantiation of the multiple instantiations of the LIU circuitry, wherein the first instantiation of the LIU circuitry includes: a first transmit part, comprising: a first feedback controller configured to modify a first output waveform to fit a mask of a first communication protocol, the modification resulting in a second output waveform that fits the mask of the first communication protocol; and
   a second instantiation of the multiple instantiations of the LIU circuitry, wherein the second instantiation of the LIU circuitry includes: a second transmit part, comprising: a second feedback controller configured to modify a third output waveform to fit a mask of a second communication protocol, the modification resulting in a fourth output waveform that fits the mask of the second communication protocol.

8. The system of claim 7, wherein the first and second feedback controllers are further configured to compensate for line impedance.

9. The system of claim 8, wherein the first and second feedback controllers are further configured to compensate for a supply voltage of the LIU circuitry, a capacitance of the telecommunications line, an inductance of the telecommunications line, a doping variation of the LIU circuitry, a temperature of the LIU circuitry, or any combination thereof.

10. The system of claim 8, wherein the line impedance depends on a communication protocol.

11. The system of claim 7, wherein the first and second feedback controllers are further configured to compensate for hardware modifications.

12. The system of claim 11, wherein the hardware modifications include changing the mask to an other mask of an other communication protocol.

13. The system of claim 7, wherein the first and second feedback controllers are further configured to operate independently of other instantiations of the LIU circuitry.

14. The system of claim 7, wherein the first and second communication protocols each include respective protocols for time-division multiplexed signals.

15. A system comprising: input/output circuitry, comprising:
   line interface unit (LIU) circuitry configured to:
   drive telecommunications signals on a telecommunications line; and
   derive multiple instantiations of itself, each of the multiple instantiations corresponding to a respective communications protocol and including:
   an analog part; and
   a digital part, comprising: a digital state machine configured to:

convert a first electromagnetic signal into a second electromagnetic signal representative of a sequence of samples according to, in part, feedback of a feedback controller of the analog part; and communicate the sequence of samples to the analog part, the analog part, comprising:

a digital-to-analog converter configured to convert the sequence of samples into an analog differential electromagnetic signal;

a line driver configured to communicate the analog differential electromagnetic signal to the telecommunications line; and the feedback controller, the feedback controller configured to output the feedback according to the analog differential electromagnetic signal and a reference signal that fits a mask of the communication protocol.

16. The system of claim 15, further comprising a reference voltage generator, and wherein the feedback controller further includes: a comparator configured to compare the analog differential electromagnetic signal outputted on the telecommunications line to the reference signal, the reference signal generated by the reference voltage generator.

17. The system of claim 15, wherein each of the multiple instantiations further includes a sampling point mechanism configured to control the digital state machine to accurately sample the analog differential electromagnetic signal with respect to the communication protocol.

18. The system of claim 15, wherein the feedback controller is further configured to compensate for an environmental condition, a hardware modification, or both.

19. The system of claim 15, wherein the communication protocol includes a protocol for time-division multiplexed signals.

20. The LIU circuitry of claim 1, wherein the first instantiation of the LIU circuitry includes a first analog part and a first digital part, and wherein the second instantiation of the LIU circuitry includes a second analog part and a second digital part.

21. The LIU circuitry of claim 20, wherein the first analog part includes the first feedback controller, and wherein the second analog part includes the second feedback controller.

* * * * *